US009552262B2

(12) United States Patent
Amanuddin et al.

(10) Patent No.: US 9,552,262 B2
(45) Date of Patent: Jan. 24, 2017

(54) METHOD, SYSTEM AND PROGRAM PRODUCT FOR DEPLOYING AND ALLOCATING AN AUTONOMIC SENSOR NETWORK ECOSYSTEM

(71) Applicant: International Business Machines Corporation, Armonk, NY (US)

(72) Inventors: Riz S. Amanuddin, Santa Cruz, CA (US); Jonghae Kim, Fishkill, NY (US); Moon J. Kim, Wappingers Falls, NY (US); Eric Yee, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 14/257,220

(22) Filed: Apr. 21, 2014

(65) Prior Publication Data
US 2014/0229759 A1 Aug. 14, 2014

Related U.S. Application Data

(62) Division of application No. 10/972,610, filed on Oct. 25, 2004, now abandoned.

(51) Int. Cl.
*G06F 13/00* (2006.01)
*G06F 11/20* (2006.01)
(Continued)

(52) U.S. Cl.
CPC ......... *G06F 11/2025* (2013.01); *G08B 25/003* (2013.01); *G08B 25/10* (2013.01);
(Continued)

(58) Field of Classification Search
CPC .. H04L 67/12; H04Q 2209/47; G06F 11/2025;
G06F 11/2041; G06F 11/2048; G06F 2201/805; G08B 25/10; G08B 25/003; H04W 4/06; H04W 48/08; H04W 88/14; H04W 88/16
(Continued)

(56) References Cited

U.S. PATENT DOCUMENTS 2,721,129 A 10/1955 Warren
3,828,306 A 8/1974 Angeloni
(Continued)

FOREIGN PATENT DOCUMENTS

CN 1486453 3/2008
EP 0722141 A2 7/1996
(Continued)

OTHER PUBLICATIONS

Sohrabi, K., "Protocols for Self-Organization for a Wireless Sensor Network", IEEE Personal communications, IEEE Communications Society, US, vol. 7, No. 5, Oct. 2000, pp. 16-27.
(Continued)

*Primary Examiner* — Kenneth R Coulter
(74) *Attorney, Agent, or Firm* — Lisa Ulrich; Hoffman Warnick LLC

(57) ABSTRACT

The present invention provides a method, system and program product for deploying, allocating and providing backup for an autonomic sensor network ecosystem. Under the present invention, the autonomic sensor network ecosystem includes: (1) a set (e.g., one or more) of sensor networks for storing data components; (2) a set of sensor collector information gateways in communication with the sensor networks; and (3) a set of enterprise gateways and storage hubs (hereinafter enterprise gateways). Each sensor network includes a set of sensor peers and at least one super peer. The super peer manages the sensor network and communicates with the set of sensor collector information
(Continued)

gateways. The autonomic sensor network ecosystem of the present invention is deployed and allocated in such a manner that backup and resiliency is provided.

8 Claims, 13 Drawing Sheets

(51) Int. Cl.
| | |
|---|---|
| *G08B 25/10* | (2006.01) |
| *G08B 25/00* | (2006.01) |
| *H04W 4/06* | (2009.01) |
| *H04W 48/08* | (2009.01) |
| *H04W 88/14* | (2009.01) |
| *H04W 88/16* | (2009.01) |

(52) U.S. Cl.
CPC ...... *G06F 11/2041* (2013.01); *G06F 11/2048* (2013.01); *G06F 2201/805* (2013.01); *H04W 4/06* (2013.01); *H04W 48/08* (2013.01); *H04W 88/14* (2013.01); *H04W 88/16* (2013.01)

(58) Field of Classification Search
USPC ....... 709/201, 208, 226, 229, 224, 223, 239; 702/188; 714/4.11
See application file for complete search history.

(56) References Cited

U.S. PATENT DOCUMENTS

| | | | |
|---|---|---|---|
| 5,389,935 A | 2/1995 | Drouault et al. | |
| 5,504,717 A | 4/1996 | Sharkey et al. | |
| 5,565,858 A | 10/1996 | Guthrie | |
| 5,774,876 A | 6/1998 | Woolley et al. | |
| 5,804,810 A | 9/1998 | Woolley et al. | |
| 6,155,292 A | 12/2000 | Kurata | |
| 6,169,476 B1 | 1/2001 | Flanagan | |
| 6,293,861 B1 | 9/2001 | Berry | |
| 6,437,692 B1 | 8/2002 | Petite et al. | |
| 6,614,351 B2 | 9/2003 | Mann et al. | |
| 6,661,635 B1 | 12/2003 | Meid | |
| 6,684,137 B2 | 1/2004 | Takagi et al. | |
| 6,693,511 B1 | 2/2004 | Seal | |
| 6,795,786 B2 | 9/2004 | LaMarca et al. | |
| 6,820,210 B1 | 11/2004 | Daruwalla et al. | |
| 6,845,394 B2* | 1/2005 | Ritche .................. | G06F 8/60 709/221 |
| 6,888,459 B2 | 5/2005 | Stilp | |
| 6,934,540 B2 | 8/2005 | Twitchell, Jr. | |
| 6,937,602 B2 | 8/2005 | Whitehill et al. | |
| 6,947,957 B1 | 9/2005 | Lange | |
| 7,019,639 B2 | 3/2006 | Stilp | |
| 7,081,818 B2 | 7/2006 | Eckstein et al. | |
| 7,089,099 B2 | 8/2006 | Shostak et al. | |
| 7,096,125 B2 | 8/2006 | Padmanabhan et al. | |
| 7,200,132 B2 | 4/2007 | Twitchell, Jr. | |
| 7,212,121 B2 | 5/2007 | Hashimoto et al. | |
| 7,225,220 B2 | 5/2007 | Gonzalez et al. | |
| 7,231,180 B2 | 6/2007 | Benson et al. | |
| 7,277,950 B1 | 10/2007 | Chapweske | |
| 7,317,898 B2 | 1/2008 | Tegreene | |
| 7,460,549 B1 | 12/2008 | Cardei et al. | |
| 7,475,158 B2 | 1/2009 | Ferri et al. | |
| 7,734,752 B2* | 6/2010 | Zuk .................... | H04L 29/06 709/205 |
| 2002/0103907 A1 | 8/2002 | Petersen | |
| 2002/0116460 A1 | 8/2002 | Treister et al. | |
| 2002/0124081 A1 | 9/2002 | Primm et al. | |
| 2002/0152290 A1* | 10/2002 | Ritche .................. | G06F 8/60 709/221 |
| 2002/0161821 A1 | 10/2002 | Narayan et al. | |
| 2003/0063585 A1 | 4/2003 | Younis et al. | |
| 2003/0137415 A1 | 7/2003 | Thomson | |
| 2003/0151513 A1 | 8/2003 | Herrmann et al. | |
| 2003/0212821 A1 | 11/2003 | Gillies et al. | |
| 2003/0222777 A1 | 12/2003 | Sweatt | |
| 2003/0234730 A1 | 12/2003 | Arms et al. | |
| 2004/0021582 A1 | 2/2004 | Ohdachi et al. | |
| 2004/0028023 A1 | 2/2004 | Mandhyan et al. | |
| 2004/0030507 A1 | 2/2004 | Jung | |
| 2004/0083278 A1 | 4/2004 | Becherer | |
| 2004/0153458 A1 | 8/2004 | Noble et al. | |
| 2005/0012613 A1 | 1/2005 | Eckstein et al. | |
| 2005/0060202 A1 | 3/2005 | Taylor et al. | |
| 2005/0087235 A1 | 4/2005 | Skorpik et al. | |
| 2005/0088299 A1 | 4/2005 | Bandy et al. | |
| 2005/0162270 A1 | 7/2005 | Lambright et al. | |
| 2005/0198228 A1 | 9/2005 | Bajwa et al. | |
| 2005/0212661 A1 | 9/2005 | Friedrich | |
| 2006/0005231 A1* | 1/2006 | Zuk .................... | H04L 29/06 726/3 |
| 2006/0025897 A1 | 2/2006 | Shostak et al. | |
| 2006/0062154 A1 | 3/2006 | Choy et al. | |
| 2006/0080819 A1 | 4/2006 | McAllister | |
| 2006/0126501 A1 | 6/2006 | Ramaswamy et al. | |
| 2006/0181414 A1 | 8/2006 | Bandy et al. | |
| 2007/0020153 A1 | 1/2007 | Hyacinthe | |
| 2008/0034108 A1 | 2/2008 | Chapweske | |
| 2008/0132264 A1 | 6/2008 | Krishnamurthy et al. | |
| 2008/0198753 A1 | 8/2008 | Choudhury et al. | |

FOREIGN PATENT DOCUMENTS

| | | |
|---|---|---|
| EP | 0942274 A2 | 9/1999 |
| EP | 1441320 A1 | 7/2004 |
| FR | 2721129 A1 | 12/1995 |
| JP | 2000315974 A | 11/2000 |
| WO | 2006045793 A1 | 5/2006 |

OTHER PUBLICATIONS

Gutierrez, J. et al., "IEEE 802.15.4: Developing Standard for Low-Power Low-Cost Wireless Personal Area Networks," IEEE Network, IEEE Service Center, New York, NY, US, Sep. 2001, pp. 12-19.

Wise, "Integrated Microsystems: Merging MEMS, Micropower Electronics, an Wireless Communications", IEEE Xplore, 2 pages.

Wei, "Grid Gateway: Message-Passing Between Separated Cluster Interconnects", Institute of Computing Technology, Chinese Academy of Sciences, Beijing, 8 pages.

Boukerche et al., "Analysis of a Randomized Congestion Control Scheme with DSDV Routing in ad Hoc Wireless Networks", Journal of Parallel and Distributed Computing, pp. 967-995, Feb. 26, 2002.

Marsh, "Autonomic Wireless Sensor Networks", www.sciencedirect.com, Engineering Applications of Artificial Intelligence, 17, 2004, pp. 741-748.

Hossain, Examiner's Answer for U.S. Appl. No. 10/972,610 dated Feb. 23, 2011, 18 pages.

Truong, "Self-Managing Sensor-Based Middleware for Performance Monitoring and Data Integration in Grids", 19th IEEE international Parallel and Distributed Processing Symposium '05, 10 pages.

Hong, "Load Balanced, Energy-Aware Communications for MARS Sensor Networks", IEEE Xplore, Aerospace Conference Proceedings, 2002, 9 pages.

Hossain, U.S. Appl. No. 10/972,610, Office Action Communication, Jul. 22, 2010, 20 pages.

Kim, U.S. Appl. No. 11/531,723, Office Action Communication, May 1, 2009, 8 pages.

Kim, U.S. Appl. No. 11/531,723, Office Action Communication, May 11, 2009, 8 pages.

Ferri, U.S. Appl. No. 10/856,684, Office Action Communication, Mar. 25, 2008, 14 pages.

Ferri, U.S. Appl. No. 10/856,684, Notice of Allowance and Fee(s) Due, Aug. 26, 2008, 9 pages.

Amanuddin, U.S. Appl. No. 11/220,961, Office Action Communication, Jan. 27, 2009, 20 pages.

(56) References Cited

OTHER PUBLICATIONS

Amanuddin, U.S. Appl. No. 10/972,610, Office Action Communication, Feb. 8, 2010, 21 pages.
Amanuddin, U.S. Appl. No. 10/972,610, Office Action Communication, Feb. 18, 2009, 10 pages.
Amanuddin, U.S. Appl. No. 10/972,610, Office Action Communication, Apr. 3, 2008, 16 pages.
Childs, "Deployment of Grid Gateways Using Virtual Machines", Department of Computer Science, Trinity College, Dublin, Ireland, 10 pages.
Amanuddin, U.S. Appl. No. 10/972,610, Office Action Communication, Aug. 6, 2009, 10 pages.
Choy, U.S. Appl. No. 10/946,714, Office Action Communication, Nov. 10, 2009, 15 pages.
Amanuddin, U.S. Appl. No. 11/220,961, Office Action Communication, Dec. 8, 2009, 20 pgs.
Behringer, EP Application No. 05 747 676.4, Examination Report, Jun. 20, 2011, 6 pages.
Choy, U.S. Appl. No. 10/946,714, Notice of Allowance and Fees Due, Feb. 24, 2010, 16 pgs.
Ferri, U.S. Appl. No. 12/204,981, filed Sep. 5, 2008, Office Communication dated Feb. 19, 2010, 24 pages.
Amanuddin, U.S. Appl. No. 11/220,961, Office Action Communication, May 13, 2010, 28 pages.
Tang, U.S. Appl. No. 11/230,961, Office Action Communication, Jun. 14, 2011, 9 pages.
Gutierrez, et al., "A Developing Standard for Low-Power Low-Cost Wireless Personal Area Networks," Oct. 2001, 9 pages.
Barot, U.S. Appl. No. 12/204,981, Office Action Communication, Aug. 20, 2010, 17 pages.
Pfizenmayer, U.S. Appl. No. 11/220,961, Office Action Communication, Oct. 22, 2010, 28 pages.
Barot, Office Action Communication for U.S. Appl. No. 12/204,981 dated Feb. 18, 2011, 13 pages.
Kazuhiro Mizoguchi et al., "A study of Keeping of Plural Spare Routes in Ad-Hoc Network", The Institute of Electronics, Information and Communication Engineers Technical Report, vol. 103, No. 388, pp. 45-48.
Arata Toyoda et al., "Development of Novel Wireless Sensor-Network System and Its Application for Environmental Monitoring", NEC Technical Journal, vol. 57, No. 1, pp. 54-58.
Hiroshi Saito et al., IN2002-227 "Performance Metrics and its Evaluation in Sensor Networking", The Institute of Electronics, Information and Communication Engineers Technical Report, vol. 102, No. 693, pp. 129-132.
Taichi Yuki et al., "A study on Performance Improvement of TCP over an Ad Hoc Network", The Institute of Electronics, Information and Communication Engineers, vol. J85-B, No. 12, pp. 2045-2053.
Japanese Patent Application No. 2007-513914, Office Action Communication, Jul. 20, 2010, with English Translation, 3 pages.
Barot, U.S. Appl. No. 12/204,981, Office Action Communication, Jun. 13, 2011, 8 pages.

\* cited by examiner

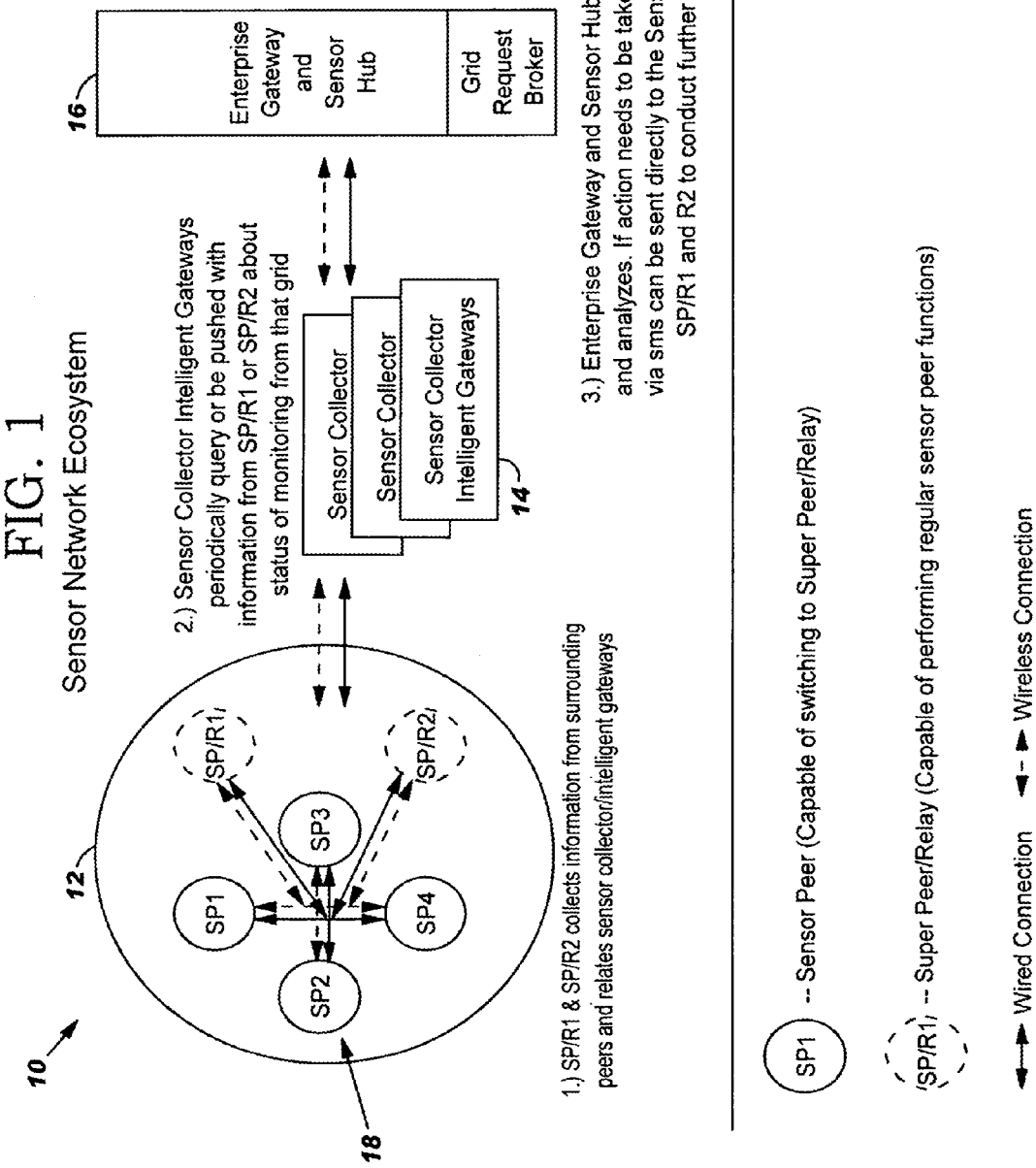

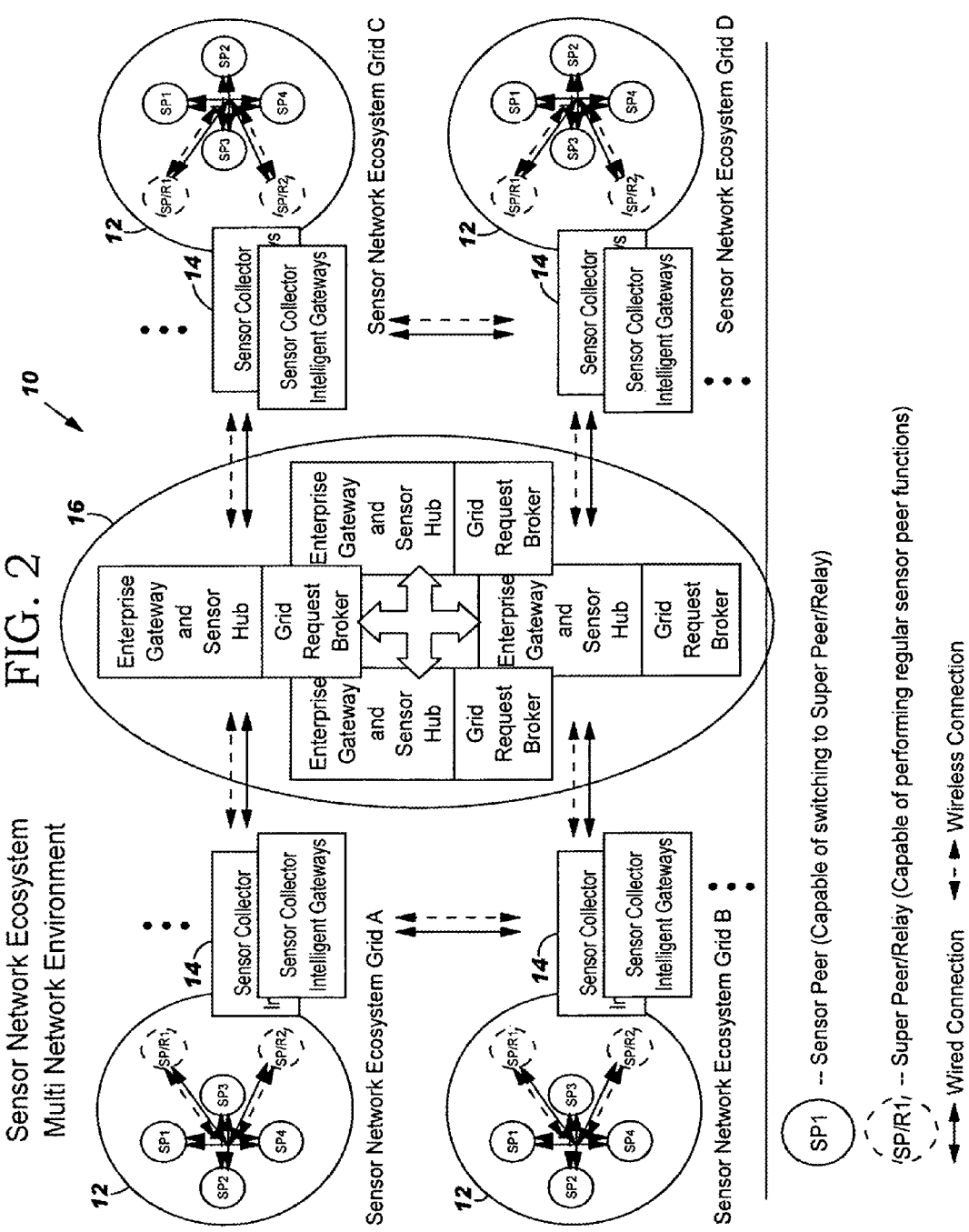

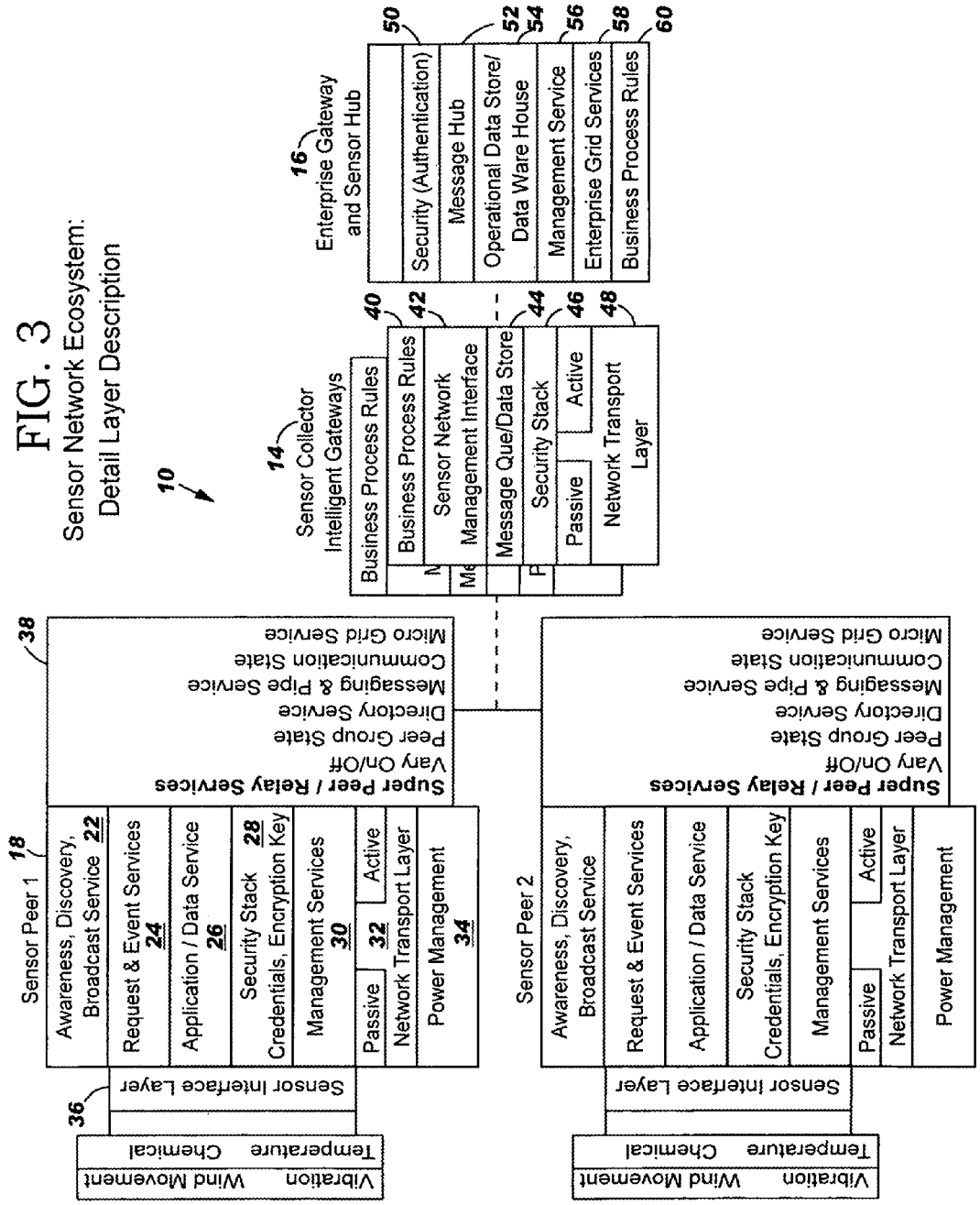

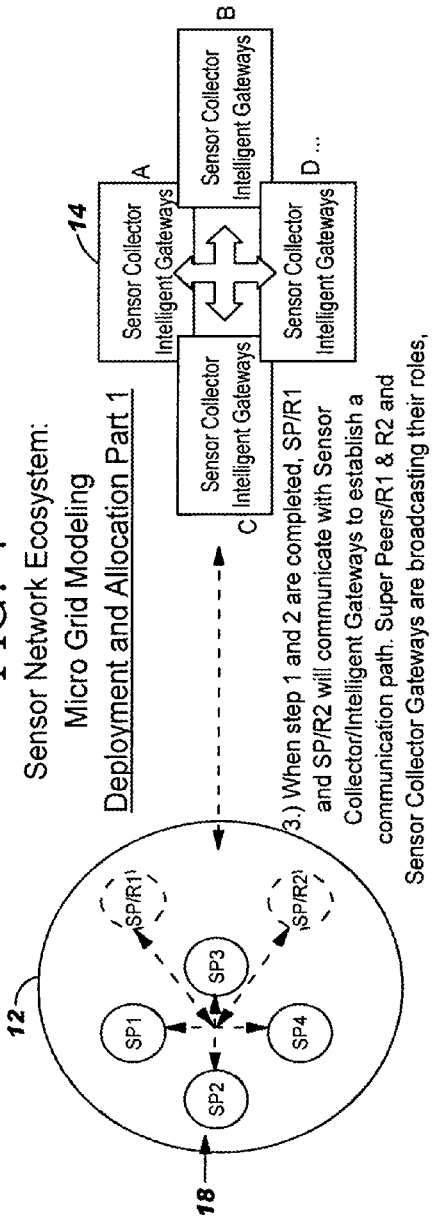

FIG. 4
Sensor Network Ecosystem:
Micro Grid Modeling
Deployment and Allocation Part 1

3.) When step 1 and 2 are completed, SP/R1 and SP/R2 will communicate with Sensor Collector/Intelligent Gateways to establish a communication path. Super Peers/R1 & R2 and Sensor Collector Gateways are broadcasting their roles, resource availability, and location to each other.

SP/R1 and SP/R2 Table — 60

| Sensor Mac ID | Role | Resource | location |
|---|---|---|---|
| SP1 | Sensor Peer / Super Peer | 100% | N |
| SP2 | Sensor Peer / Super Peer | 100% | W |
| SP3 | Sensor Peer / Super Peer | 100% | E |
| SP4 | Sensor Peer / Super Peer | 100% | S |
| SP/R1 | Sensor Peer / Super Peer | 100% | NE |

1.) Sensor Peers and SP/R1 and SP/R2 are broadcasting their roles, resource availability, location, and functionality. Bonding takes place with each peer and super peer. SP/R1 and SP/R2 create a table of information: SP/R2 Table 2.) Sensor Collector Intelligent Gateways broadcast their roles, resource availability, location amongst themselves and starts bonding and each creates a table:

Sensor Collector Intelligent Gateways C Table — 62

| Sensor Collector Gateway | Role | Resource | Location |
|---|---|---|---|
| Gateway A | Gateway | 100% | N |
| Gateway B | Gateway | 100% | E |
| Gateway D | Gateway | 100% | S |
| ... | | | |

SP1 -- Sensor Peer (Capable of switching to Super Peer/Relay)

SP/R1 -- Super Peer/Relay (Capable of performing regular sensor peer functions)

↕ -- Wired or Wireless Connection

FIG. 5

| Sensor Mac ID | Role | Resource | location |
|---|---|---|---|
| SP1 | Sensor Peer / Super Peer | 100% | N |
| SP2 | Sensor Peer / Super Peer | 100% | W |
| SP3 | Sensor Peer / Super Peer | 100% | E |
| SP4 | Sensor Peer / Super Peer | 100% | S |
| SP/R1 | Sensor Peer / Super Peer | 100% | NE |

60

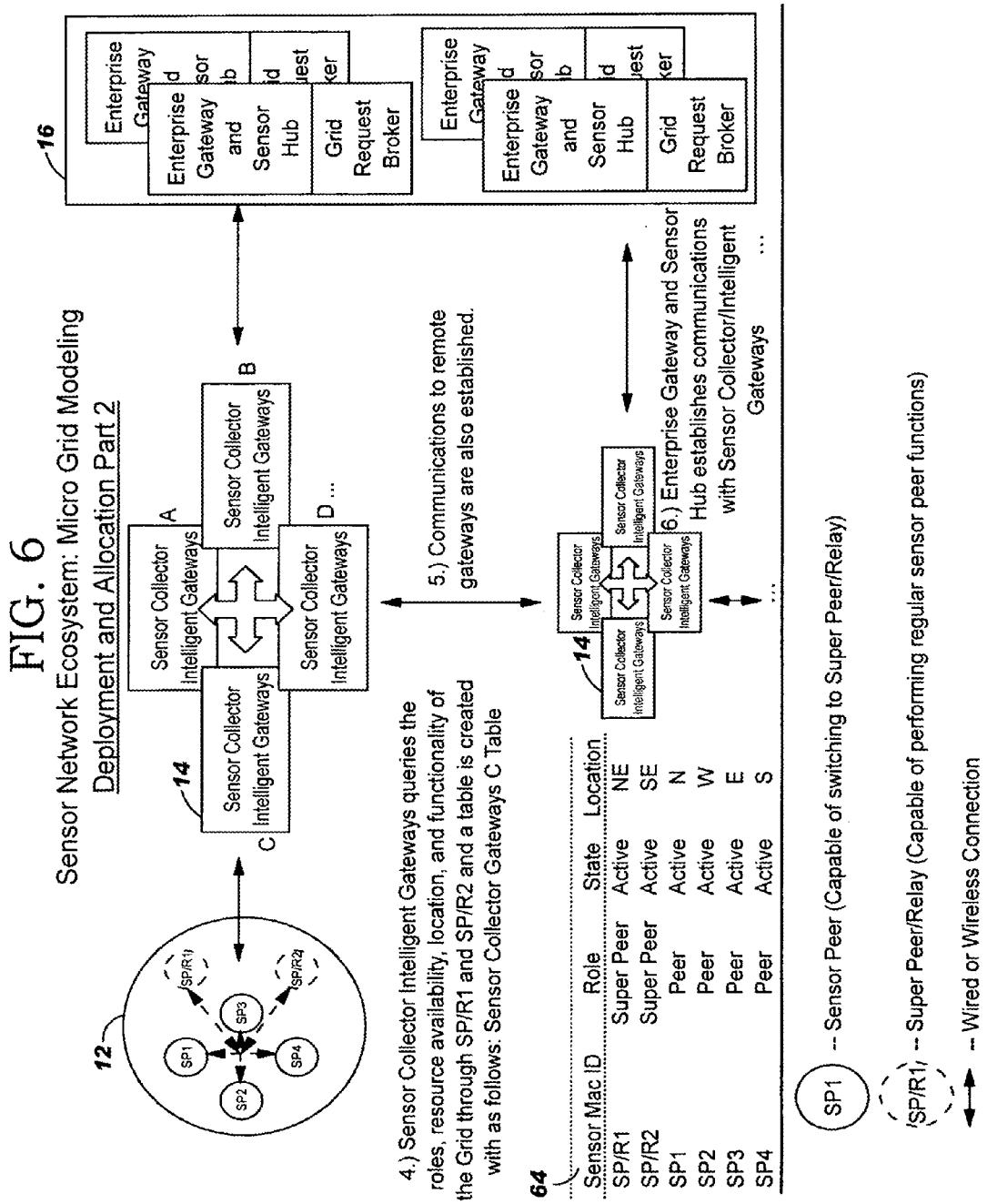

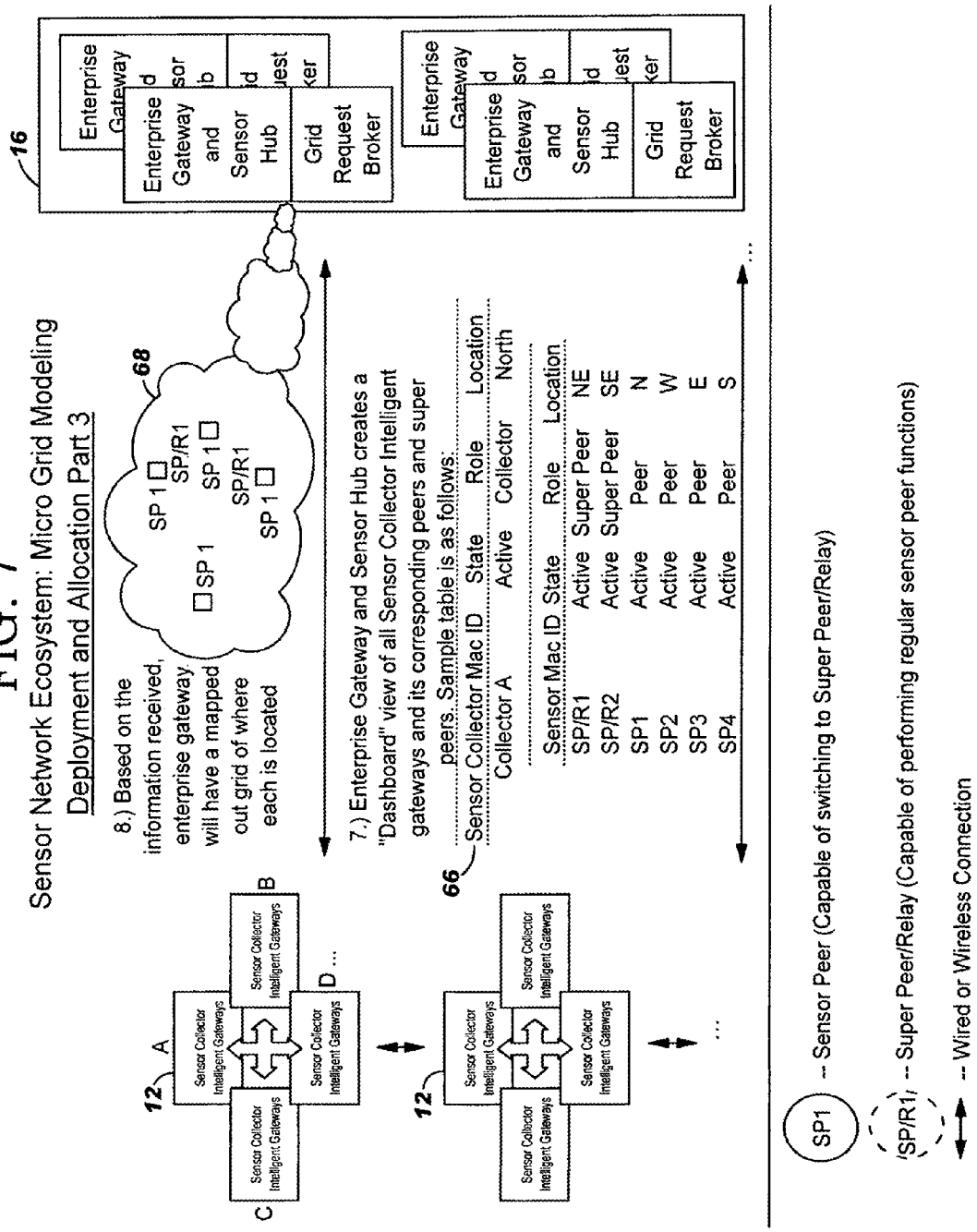

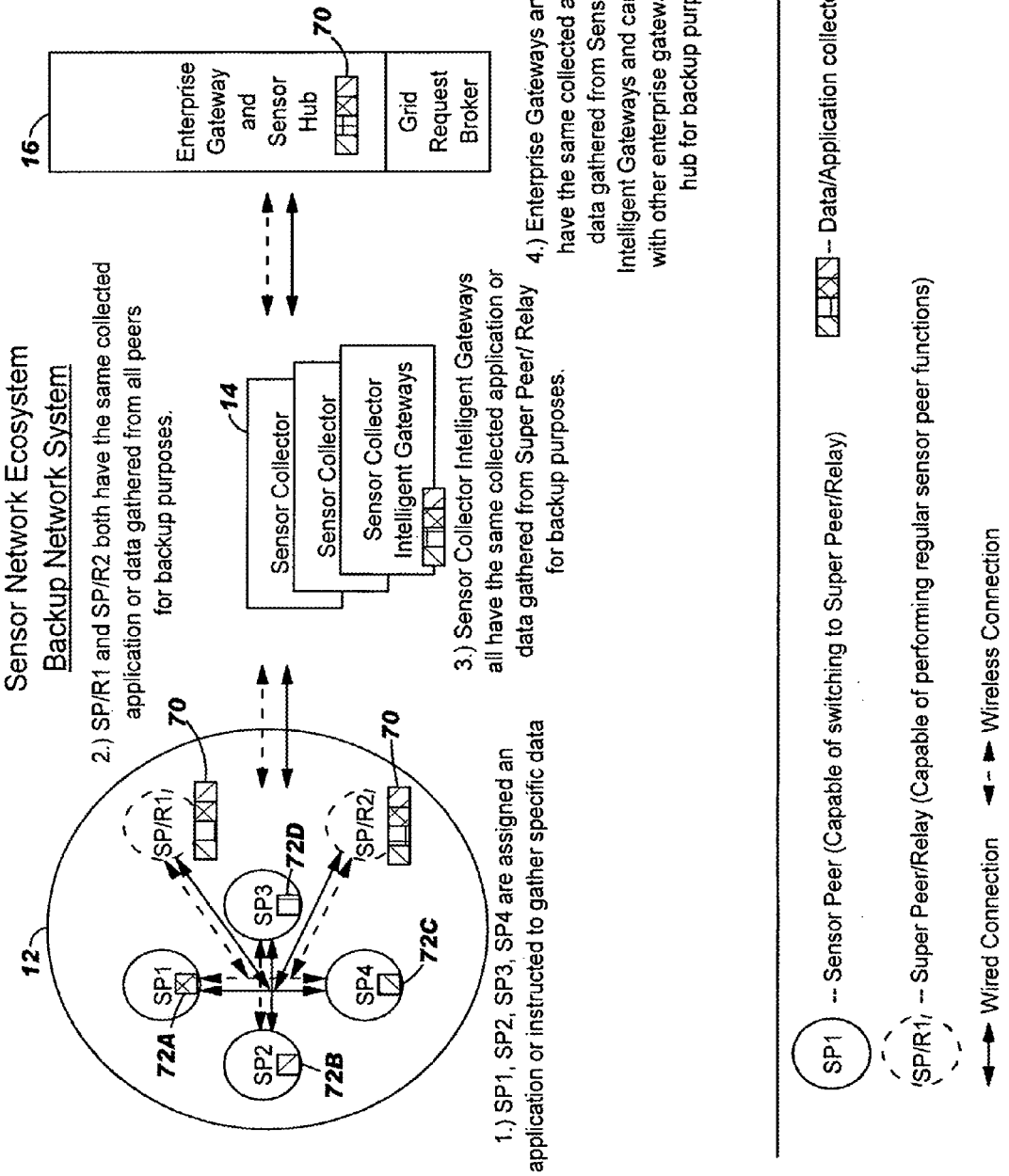

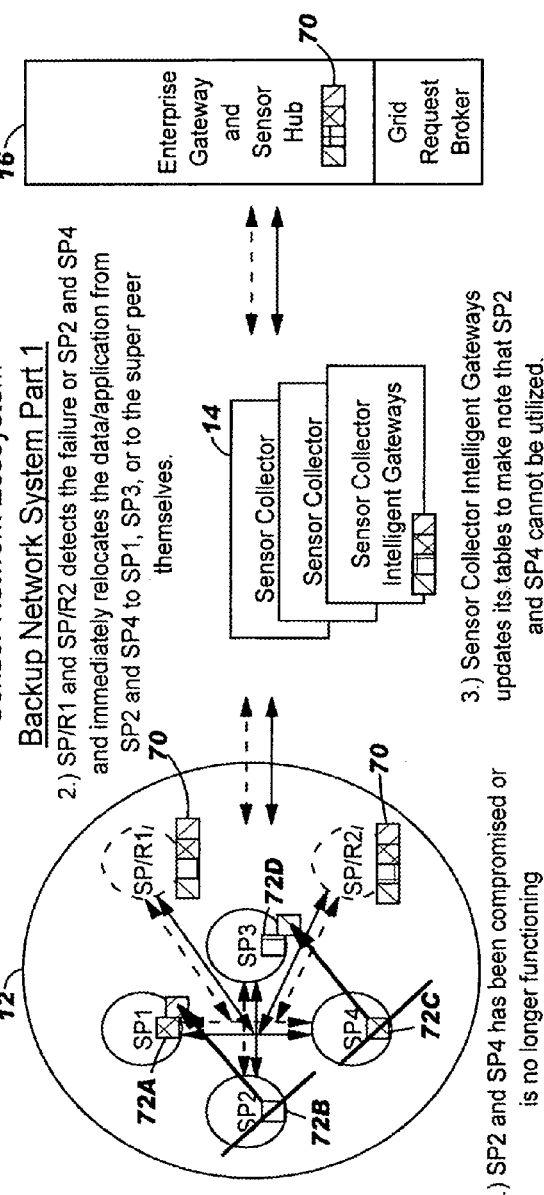

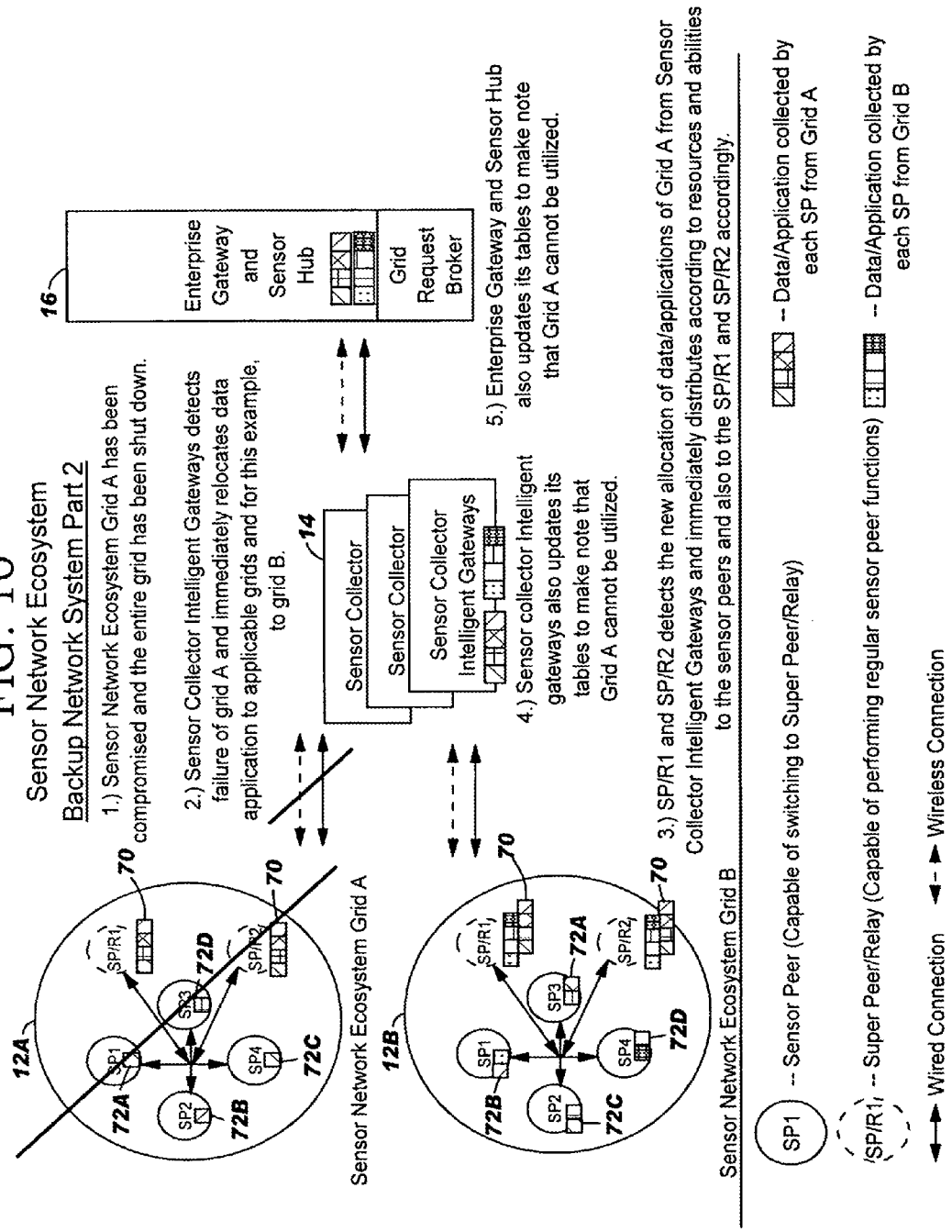

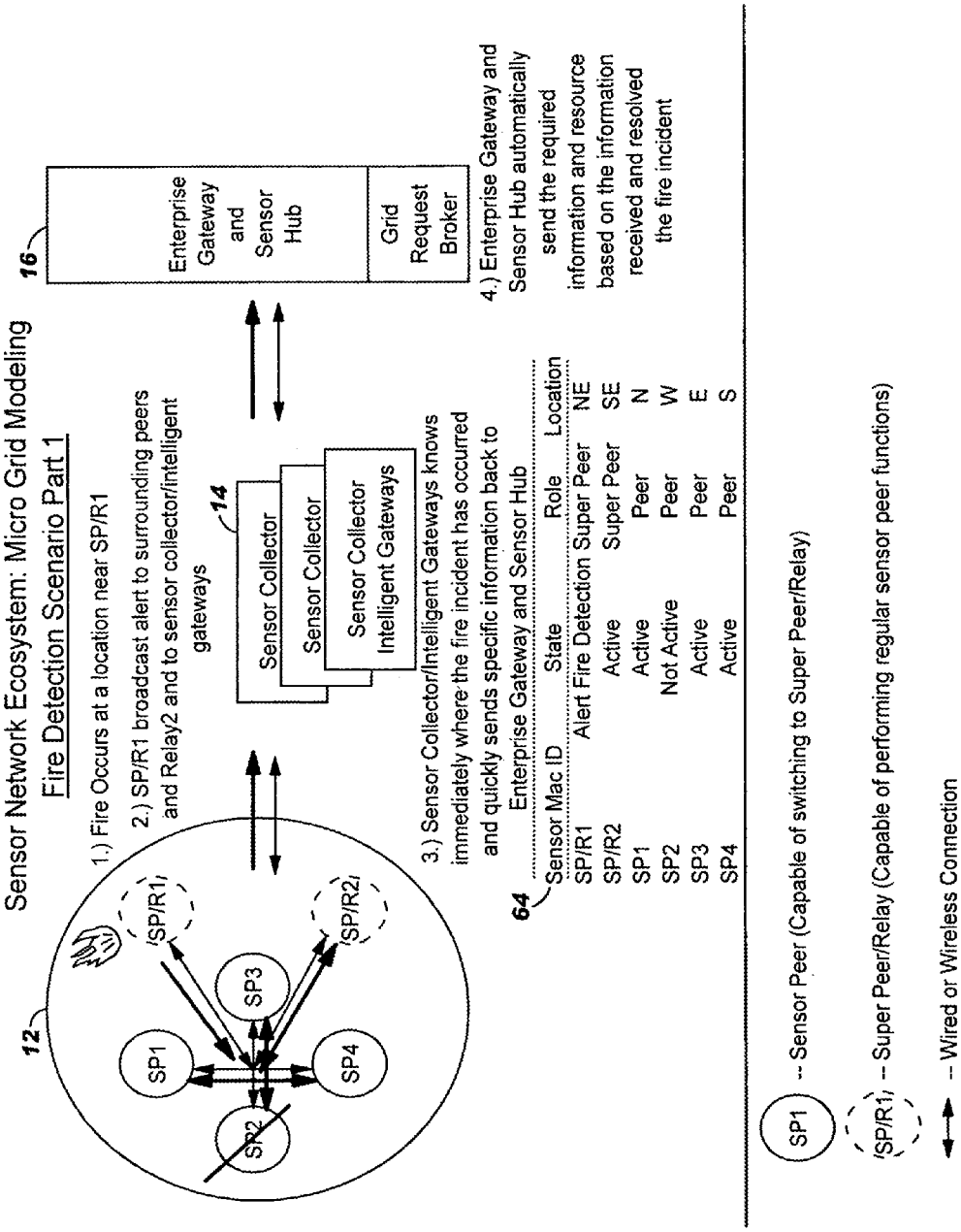

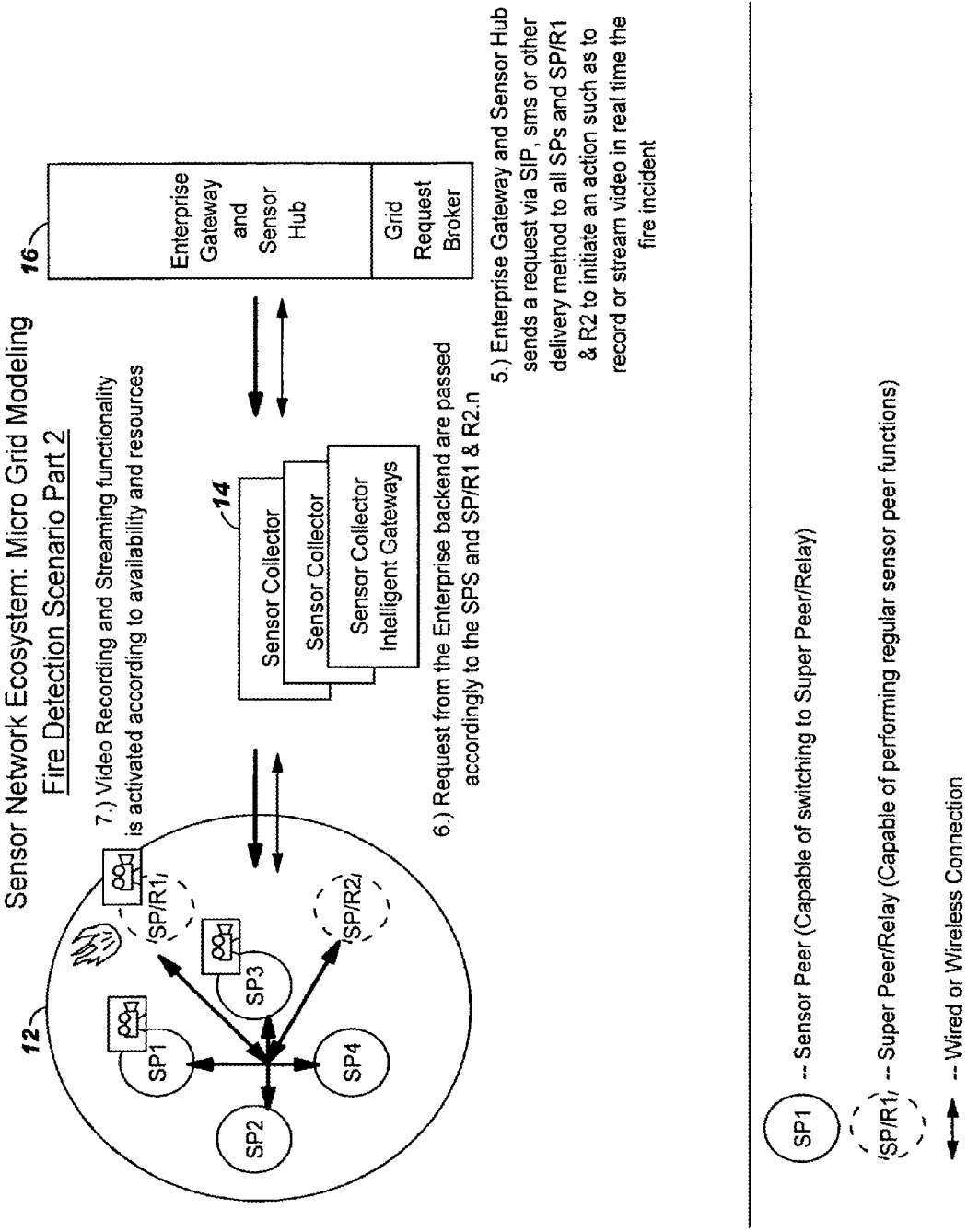

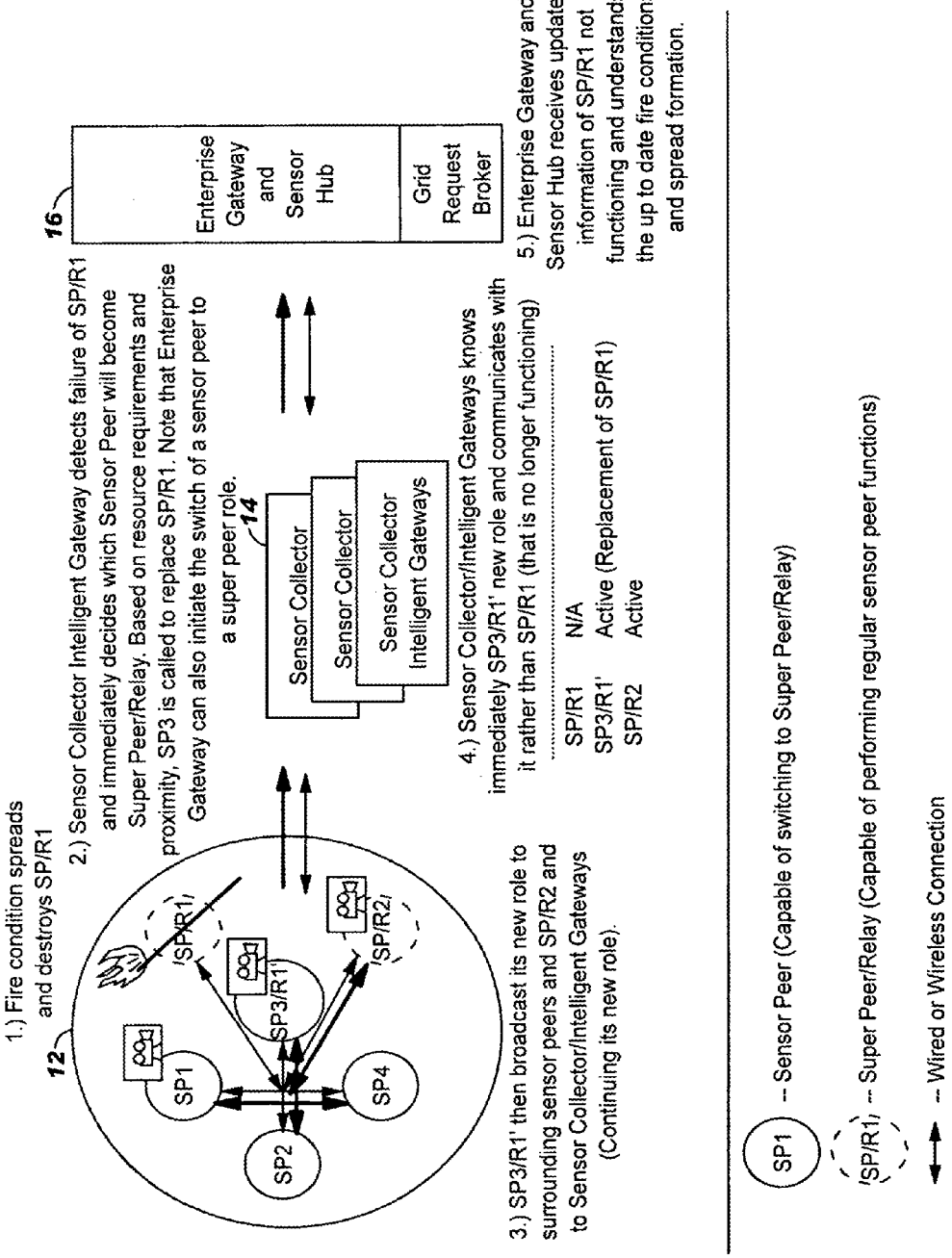
FIG. 13    Sensor Network Ecosystem: Micro Grid Modeling Fire Detection Scenario: SP/R1 Destroyed

METHOD, SYSTEM AND PROGRAM PRODUCT FOR DEPLOYING AND ALLOCATING AN AUTONOMIC SENSOR NETWORK ECOSYSTEM

CLAIM OF PRIORITY

This application is a Divisional Application of co-pending U.S. patent application Ser. No. 10/972,610, filed on Oct. 25, 2004, which is hereby incorporated by reference.

CROSS-REFERENCE TO RELATED APPLICATIONS

This Application is related in some aspects to commonly assigned U.S. Pat. No. 7,475,158 B2, entitled "Method for Enabling a Wireless Sensor Network by Mote Communication," issued Jan. 6, 2006 and hereby incorporated by reference. This Application is also related in some aspects to commonly assigned U.S. Pat. No. 7,769,848 B2, entitled-"Method and Systems for Copying Data Components Between Nodes of a Wireless Sensor Network," issued Aug. 3, 2010, and also incorporated by reference.

FIELD OF THE INVENTION

The present invention generally relates to an autonomic sensor network ecosystem. Specifically, the present invention relates to a method, system and program product for deploying, allocating and providing backup for the autonomic sensor network ecosystem.

BACKGROUND OF THE INVENTION

In traditional computer-based storage systems, data is typically stored in sophisticated systems with layers of protections, backups systems, and encryption algorithms. However, today, there exist numerous environmental-based public safety hazards, such as brush fires, bio-chemical accidents or attacks, etc. Obtaining real-time and accurate information about such a hazard can be critical to containing the hazard and minimizing damage. In existing storage systems, data can still be lost as a consequence of technical failures, viruses, or unpredictable disasters. A current focus is to build a static structure that contains the data and its backup. Unfortunately, this does not help in a globally distributed networked environment. Moreover, conventional disaster recovery systems fail to protect the data from outside attacks (e.g. hackers) and natural disasters.

U.S. patent application Ser. No. 10/856,684 (cross-referenced and incorporated above), takes a step towards avoiding data loss by providing a wireless sensor network in which a plurality of peers/motes/nodes are interconnected (e.g., on a peer-to-peer basis). To store a data set within the network, the data set is broken up into data components, which are then stored among the nodes. Storage of the data components typically occurs by following a routing path through the network according to a routing table or the like. As the path is followed, the data components are stored among the nodes. Further, each node in the network is provided with a sensor for sensing environmental factors that could impact the capability of a node to transmit or store the data components. Other examples of sensor based detection systems are described in U.S. Pat. Nos. 6,169,476 B1 and 6,293,861 B1, both of which are herein incorporated by reference.

Under U.S. patent application Ser. No. 10/946,714 (cross-referenced and incorporated above), a sensor network comprising a plurality of peer-to-peer nodes is provided. Each node in the network includes, among other things, a sensor for detecting environmental factors. When a potential failure is detected within a node, the node will query its neighboring nodes to determine whether they have the capability to store any data component(s) currently stored within the potentially failing node. Based on the querying, the data component(s) in the potentially failing node are copied to one or more of the neighboring nodes. Thereafter, details of the copying can be broadcast to other nodes in the network, and any routing tables that identify the locations of data components stored throughout the sensor network can be updated.

As advanced as this storage technology has become, the rise of wireless technologies and peer-to-peer delivery systems is forcing the Information Technology (IT) industry to decentralize infrastructure and its applications. Thus, the current static structure that is comprised of the traditional network, data, and applications will not help in a globally distributed sensor network environment. Even locating the hardware that supports the structure in one or multiple distributed sites will not help. Therefore, conventional IT concepts are changing to adopt a new model. Specifically, a need still exists for a data storage technology that is resilient, redundant and optimized in multi-network environment. To this extent, a need exists for a method, system and program product for deploying, allocating and providing backup for an autonomic sensor network ecosystem.

SUMMARY OF THE INVENTION

In general, the present invention provides an autonomic sensor network in a multi-network environment. Specifically, the present invention provides a method, system and program product for deploying, allocating and providing backup for an autonomic sensor network ecosystem. Under the present invention, the autonomic sensor network ecosystem includes: (1) a set (e.g., one or more) of sensor networks for storing data components; (2) a set of sensor collector information gateways in communication with the sensor networks; and (3) a set of enterprise gateways and storage hubs (hereinafter referred to as enterprise gateways) in communication with the sensor collector intelligent gateways. Each sensor network includes a set of sensor peers and at least one super peer. The super peer manages the sensor network and communicates with the set of sensor collector information gateways. The autonomic sensor network ecosystem of the present invention is deployed and allocated in such a manner that backup and resiliency is provided.

A first aspect of the present invention provides a sensor network, comprising: a set of sensor peers and at least one super peer for storing data components; and wherein the set of peers and the at least one super peer each include a system for bonding to form the sensor network, and a system for broadcasting their identities, roles, resource availabilities and locations to each other, and wherein the at least one super peer creates and maintains a table of peer information that indicates the identities, the roles, the resource availabilities and the locations of the set of peers and the at least one super peer.

A second aspect of the present invention provides an autonomic sensor network ecosystem, comprising: a sensor network having a set of sensor peers and at least one super peer for storing data components, wherein the at least one super peer creates and maintains a table of peer information that indicates identities, roles, resource availabilities, and locations of the set of peers and the at least one super peer; a set of sensor collector intelligent gateways in communication with the at least one super peer, wherein the set of sensor collector intelligent gateways creates and maintains a table of gateway information that indicates identities, roles, resource availabilities and locations of the set of sensor collector intelligent gateways, and wherein the set of sensor collector intelligent gateways receives the table of peer information from the at least one super peer; and a set of enterprise gateways in communication with the set of sensor collector intelligent gateways, wherein the set of enterprise gateways utilizes the table of peer information and the table of gateway information to create and maintain a table of ecosystem information.

A third aspect of the present invention provides method for deploying and allocating an autonomic sensor network ecosystem, comprising: providing a sensor network having a set of sensor peers and at least one super peer for storing data components, wherein the at least one support peer creates and maintains a table of peer information that indicates identities, roles, resource availabilities, and locations of the set of peers and the at least one super peer; providing a set of sensor collector intelligent gateways in communication with the at least one super peer, wherein the set of sensor collector intelligent gateways creates and maintains a table of gateway information that indicates identities, roles, resource availabilities and locations of the set of sensor collector intelligent gateways, and wherein the set of sensor collector intelligent gateways receives the table of peer information from the at least one super peer; and providing a set of a set of enterprise gateways in communication with the set of sensor collector intelligent gateways, wherein the set of enterprise gateways utilizes the table of peer information and the table of gateway information to create and maintain a table of ecosystem information.

A fourth aspect of the present invention provides a method for providing backup for an autonomic sensor network ecosystem, comprising: detecting a hazard within a sensor network of the autonomic sensor network ecosystem, wherein the sensor network includes a set of sensor peers and at least one super peer for storing data components; determining, on a set of sensor collector intelligent gateways, a location of the hazard based a table of information that indicates identities, resource availabilities, and locations of the set of peers and the at least one super peer; and communicating details of the hazard from the set of sensor collector intelligent gateways to a set of enterprise gateways that are in communication with the sensor collector intelligent gateways within the autonomic sensor network ecosystem.

A fifth aspect of the present invention provides a method for providing backup for an autonomic sensor network ecosystem, comprising: detecting a failure of a super peer within a sensor network of the autonomic sensor network ecosystem, wherein the sensor network includes a set of sensor peers and at least one super peer for storing data components; selecting, on a set of sensor collector intelligent gateways in communication with the at least one super peer, one of the set of sensors peers to replace the failing super peer; and communicating information corresponding to the failure and the selecting from the set of sensor collector intelligent gateways to a set of enterprise gateways that are in communication with the sensor collector intelligent gateways within the autonomic sensor network ecosystem.

A sixth aspect of the present invention provides a method for providing backup for an autonomic sensor network ecosystem, comprising: providing the autonomic sensor network ecosystem, wherein the autonomic sensor network ecosystem includes a sensor network having a set of sensor peers and at least one super peer for storing data components, a set of sensor collector intelligent gateways in communication with the sensor network and a set of enterprise gateways in communication with the set of sensor collector intelligent gateways; storing a set of data components within the sensor network, the sensor collector intelligent gateways and the enterprise gateway; maintaining a table of locations of the data components within the sensor network; detecting a failure within the sensor network; relocating data components stored within the sensor network based on the failure; and communicating information corresponding to the relocating to the set of sensor collector intelligent gateways and the set of enterprise gateways, and updating the table of locations based on the relocating.

A seventh aspect of the present invention provides a method for deploying and allocating an autonomic sensor network ecosystem, comprising: providing a computer infrastructure being operable to: collect information on at least one super peer from a set of sensor peers within a sensor network of the autonomic sensor network ecosystem; create and maintaining a table of peer information that indicates identities, roles, resource availabilities and locations of the set of peers and the at least one super peer; relay the table of peer information from the at least one super peer to a set of sensor collector intelligent gateways; and sense environment factors within the sensor network.

An eight aspect of the present invention provides a program product stored on a recordable medium for deploying and allocating an autonomic sensor network ecosystem, which when executed, comprises: program code for collecting information on at least one super peer from a set of sensor peers within a sensor network of the autonomic sensor network ecosystem; program code for creating and maintaining a table of peer information that indicates identities, roles, resource availabilities and locations of the set of peers and the at least one super peer; program code for relaying the table of peer information from the at least one super peer to a set of sensor collector intelligent gateways; and program code for sensing environment factors within the sensor network.

A ninth aspect of the present invention provides computer software embodied in a propagated signal for deploying and allocating an autonomic sensor network ecosystem, the computer software comprising instructions to cause a computer system to perform the following functions: collect information on at least one super peer from a set of sensor peers within a sensor network of the autonomic sensor network ecosystem; create and maintain a table of peer information that indicates identities, roles, resource availabilities and locations of the set of peers and the at least one super peer; relay the information from the at least one super peer to a set of sensor collector intelligent gateways; and sense environment factors within the sensor network.

Therefore, the present invention provides a method, system and program product for deploying, allocating and providing backup for an autonomic sensor network ecosystem.

BRIEF DESCRIPTION OF THE DRAWINGS

These and other features of this invention will be more readily understood from the following detailed description of the various aspects of the invention taken in conjunction with the accompanying drawings in which:

FIG. 1 depicts an autonomic sensor network ecosystem according to the present invention.

FIG. 2 demonstrates that the autonomic sensor network ecosystem of FIG. 1 can be a multi-network environment.

FIG. 3 depicts a more detailed system-level diagram of the autonomic sensor network ecosystem of FIG. 1.

FIG. 4 depicts a first diagram of the deployment and allocation of the autonomic sensor network ecosystem of FIG. 1.

FIG. 5 depicts an illustrative table of peer information according to the present invention.

FIG. 6 depicts a second diagram of the deployment and allocation of the autonomic sensor network ecosystem of FIG. 1.

FIG. 7 depicts a third diagram of the deployment and allocation of the autonomic sensor network ecosystem of FIG. 1.

FIG. 8 depicts the storage of data components within the autonomic sensor network ecosystem of FIG. 1.

FIG. 9 depicts a diagram of a first illustrative backup scenario for the autonomic sensor network ecosystem of FIG. 1.

FIG. 10 depicts a diagram of a second illustrative backup scenario for the autonomic sensor network ecosystem of FIG. 1.

FIG. 11 depicts a first diagram of a third illustrative backup scenario for the autonomic sensor network ecosystem of FIG. 1.

FIG. 12 depicts a second diagram of the illustrative third backup scenario for the autonomic sensor network ecosystem of FIG. 1.

FIG. 13 depicts a diagram of a fourth illustrative backup scenario for the autonomic sensor network ecosystem of FIG. 1.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

For convenience purposes, the Best Mode for Carrying Out the Invention will have the following sub-sections:
I. General Description
II. Deployment and Allocation
III. Illustrative Backup Scenarios
I. General Description As indicated above, the present invention provides an autonomic sensor network in a multi-network environment. Specifically, the present invention provides a method, system and program product for deploying, allocating and providing backup for an autonomic sensor network ecosystem. Under the present invention, the autonomic sensor network ecosystem includes: (1) a set (e.g., one or more) of sensor/peer networks for storing data components; (2) a set of sensor collector information gateways in communication with the sensor networks; and (3) a set of enterprise gateways and storage hubs (hereinafter referred to as enterprise gateways) in communication with the sensor collector information gateways. Each sensor network includes a set of sensor peers and at least one super peer. The super peer manages the sensor network and communicates with the set of sensor collector information gateways. The autonomic sensor network ecosystem of the present invention is deployed and allocated in such a manner that backup and resiliency is provided.

Referring now to FIG. 1, an autonomic sensor network ecosystem (ecosystem) 10 according to the present invention is shown. As depicted, ecosystem 10 includes sensor/peer network 12, sensor collector intelligent gateways 14 and enterprise gateway and storage hub (enterprise gateway 16) having a grid request broker. Communication between sensor network 12, sensor collector intelligent gateways 14 and enterprise gateway 16 can occur via a hardwired connection or a wireless connection. To this extent, communication typically occurs over a network such as the Internet, a local area network (LAN), a wide area network (WAN), a virtual private network (VPN), etc. Conventional network connectivity, such as Token Ring, Ethernet, WiFi or other conventional communications standards could be used. Still yet, connectivity could be provided by conventional IP-based protocol. In this instance, an Internet service provider could be used to establish interconnectivity.

As further shown in FIG. 1, sensor network 12 generally includes a set of peers 18 comprised of a set of sensor peers (e.g., SP1-SP4) and a set of super peers (SP/R1 and SP/R2). As will be further described below, when ecosystem 10 is deployed and allocated, a data structure can be broken down into components and stored within the sensor peers of sensor network 12. Before this is described in detail, however, the deployment and allocation of ecosystem 10 will be fully described. Sensor network 12 may be implemented in an ad hoc or mesh network that comprises either a full mesh or partial mesh topology. In a full mesh topology, each peer 18 is in communication with each other peer. In a partial mesh topology, each node is not necessarily in communication with the other nodes. While the invention is typically implemented in a wireless environment, it is recognized that some or all of the communications could be implemented using a wired technology.

In general, peers 18 are configured to broadcast information (e.g., state or status information) to one another. Moreover, as will be further described below, peers 18 are configured to bond together (e.g., via JOIN and GATHER requests) to form sensor network 12. Super peers SP/R1 and SP/R2 are configured to manage sensor network 12, and to communicate with and/or relay information to sensor collector information gateway 14. Such communication/relaying can occur using push or pull (e.g., query) techniques. In any event, sensor collector information gateway 14 is itself configured to communicate with enterprise gateway 16.

As mentioned above, ecosystem 10 can be a multi-network environment. An example of this is shown in FIG. 2. Under the present invention, ecosystem 10 can include any quantity of sensor networks 12, sensor collector information gateways 14 and enterprise gateways 16. This provides optimal redundancy/resiliency in the event of failure of one or more the components.

Referring now to FIG. 3, a more detailed stack/layer diagram of ecosystem 10 is shown. As shown, each peer 18 includes the following layers/systems/services: (1) awareness, discovery and broadcast 22; (2) request and event 24; (3) application and data 26; (4) security stack credentials and encryption 28; (5) management 30; (6) network transport 32; (7) power management 34; (8) sensor 36; and (9) super peer/relay 38.

In general, awareness, discovery and broadcast system 22 allows peers 18 to communicate or exchange information with one another, and bond together to form a network. As discussed in the above cross-referenced patent applications, this process can include JOIN and GATHER and requests being exchanged. Request and event services 24 provide for detection and administration of events within the sensor network. Application and data service 26 provides for the storage of data components within the peers. To this extent, application and data service 26 store and relocate/copy data components as described din the above-incorporated patent applications. Security, stack, credentials and encryption key layer 28 provide the necessary security for the peers. Specifically, since data components will be stored therein, security is provided. Management service provides 30 for the configuring and administration of peers Network transport layer 32 includes a passive layer and an active layer. The passive layer is used for passing or "hopping" data from one peer to another. The active layer is utilized for communicating data gathered or generated by the peer itself. Power management layer 34 may comprise an energy supply such as a solar cell. Sensor layer 36 is for sensing environmental changes (e.g., vibration, wind, chemicals and temperature) and may comprise any type of sensor or sensors that measure some environmental stimuli, including physical, chemical, or biological changes. To this extent, sensor layer 36 may collect, process and store sensed data.

As further shown, each peer 18 includes super peer/relay services 38. Under the present invention each peer is capable of becoming a super peer within the sensor network. The general role of the super peers is to gather information from the other peers, maintain a table of such peer information, and relay/communicate with sensor collector information gateways 14. In the event a super peer fails, another peer within the sensor network can be "promoted" to super peer status.

It should be understood that each peer 18 could include other systems/layers/services not depicted herein. Such systems/layers/services are shown and described in the above-incorporated patent applications. For example, each peer 18 could also include a local or global routing table for indicating the locations of data components stored within the sensor network, and an update system for updating the local and/or global routing tables as data components are copied/relocated among the peers (e.g., in the event of potential failure of a peer).

As further shown in FIG. 3, sensor collector intelligent gateways 14 each include: (1) business process rules 40; (2) sensor network management interface 42; (3) message queue 44; (4) security stack 46; and (5) network transport layer 48. Business process rules 40 are used to guide decision-making and the general functionality of sensor collector intelligent gateways 14 (e.g., selecting a peer as a super peer). Sensor network management interface 42 is the interface or communication channel between sensor collector intelligent gateways 14 and the sensor networks. Message queue 44 is a queue for storing messages and communications received from and/or communicated to the sensor networks and enterprise gateways 16. Security stack 46 provides security for sensor collector intelligent gateways 14, while network transport layer 48 allows for the passing/hopping of data components.

Enterprise gateways 16 each include: (1) security layer 50; (2) message HUB 52; (3) data store 54; (4) management service 56; (5) enterprise grid service 58; and (6) business process rules 60. Security layer 50 provides security for enterprise gateways 14. Message HUB 52 handles all communications received on enterprise gateways 52. As shown in FIG. 2, a single enterprise gateway 16 could hold communication with multiple sensor collector intelligent gateways 14. Message HUB 52 helps to track all such communications. Operational data store 54 provides storage for data components. Management service 56 provides for the management of enterprise gateways 16. Enterprise grid service provides 58 for the management of ecosystem 10 as a whole. Business process rules 60 are used to guide decision-making and the general functionality of enterprise gateway 16 (e.g., recommending a course of action in response to an event within the sensor network).

It should be appreciated that although not shown, peers 18, sensor collector intelligent gateways 14 and enterprise gateways 16 are computerized devices that will also include computerized components such as a processing unit, memory, a bus, input/output (I/O) interfaces, external devices/resources and a storage unit. The processing unit may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, similar to the processing unit, memory may reside at a single physical location, comprising one or more types of data storage, or be distributed across a plurality of physical systems in various forms.

The I/O interfaces may comprise any system for exchanging information to/from an external source. The external devices/resources may comprise any known type of external device, including speakers, a CRT, LED screen, hand-held device, keyboard, mouse, voice recognition system, speech output system, printer, monitor/display, facsimile, pager, etc. The bus would provide a communication link between each of the components in the nodes and likewise may comprise any known type of transmission link, including electrical, optical, wireless, etc.

If utilized, the storage unit can be any system (e.g., a database) capable of providing storage for data components. As such, the storage unit could include one or more storage devices, such as a magnetic disk drive or an optical disk drive. In another embodiment, the storage unit includes data distributed across, for example, a local area network (LAN), wide area network (WAN) or a storage area network (SAN) (not shown).

II. Deployment and Allocation

Given the above description of ecosystem 10, the process of deploying and allocating ecosystem 10 will now be further described in conjunction with FIGS. 4-7. Referring first to FIG. 4, in order to form sensor network 12, the sensor peers and super peers within sensor network will first broadcast peer information (e.g., via broadcast layer 22 of FIG. 3) to one another. Such information includes their roles, availabilities, locations and functionalities. Upon such communications "bonding" takes place and sensor network 18 is formed.

In forming sensor network 12 in this manner, the JOIN and GATHER teachings described in the above-incorporated patent applications can be followed. For example, when a peer is first powered up, its communication can be limited to a JOIN broadcast message, which essentially says, "I'd like to join a network." Thus, when sensor network 12 is first turned on, each peer could only broadcast a JOIN, and will not receive a response until an endpoint gets involved. Endpoints are initialized with the capability of responding to JOIN broadcasts. Namely, an Endpoint will answer all JOIN broadcasts that it can detect with a GATHER response. Thus, an Endpoint recognizes JOIN broadcasts from neighboring peers, and responds with a GATHER. As soon as a peer recognizes a GATHER, the peer can become a member of sensor network 12 and can stop broadcasting the JOIN. Thus, initially, the sensor network 12 is comprised of the Endpoint and the Endpoint's neighboring peers. Neighboring peers may for example be defined as a set of nodes that can communicate with each other.

As soon as a peer establishes itself in sensor network 12, the peer can switch to a GATHER broadcast to gather its own neighbors. Thus, the cycle repeats itself, with each peer broadcasting a JOIN getting picked up as a neighbor of another nearby gathering peer (or endpoint). Again, whenever a peer becomes a neighbor within the network, it switches from JOIN to GATHER. Very quickly, all peers will become another peer's neighbor. As soon as a peer becomes a neighbor, it can collect data and send it to a neighbor. The neighbor will pass the data to its neighbor, etc., until the data makes its way back to the Endpoint. Network redundancy is established by allowing each peer to have many neighbors within the network in a manner described below.

After a short period, the entire sensor network 12 is established. At some point, when a peer is no longer receiving JOIN requests, a peer can determine that the sensor network 12 is formed. Each peer will still send out GATHERs, but at a much lower frequency, since the only new peers that would join are nodes that for example replace broken peers. In forming sensor network 12, super peers will be appointed (e.g., by sensor collector intelligent gateways 14) from among the peers.

In any event, once sensor network 12 has been formed, the super peers will create and manage a table 60 of the peer information. Referring to FIG. 5, table 60 is shown in greater detail. As shown, for each peer, table 60 includes an identifier (e.g., a MAC identifier), a role, a resource availability and a relative location within sensor network 10. As this process is occurring, sensor collector intelligent gateways 14 will broadcast gateway information similar to the peer information to one another, and bond together. Sensor collector intelligent gateways 14 will also create a table 62 of gateway information that is shown in FIG. 4. As depicted, for each sensor collector intelligent gateway 14, table 62 identifies an identifier, a role, a resource availability and a relative location within the ecosystem.

Once these first two steps are completed, the super peers within sensor network 12 will communicate with sensor collector intelligent gateways 14. During this communication the peer and gateway information (e.g., tables 60 and 62) will be exchanged. Referring to FIG. 6, this process is further illustrated. During the communication, sensor collector intelligent gateways 14 can query the super peers (or be "pushed") to obtain the peer information. The goal is for sensor collector intelligent gateways 14 to create and manage a table 64 of network information as depicted in FIG. 6. As shown, table 64 is similar to table 60 of peer information. However, table 64 further indicates a state of each peer in network 12. During this stage, sensor collector intelligent gateways 14 can also establish communication with other remote sensor collector intelligent gateways 14, while enterprise gateways 16 establish communication with sensor collector intelligent gateways 14.

Referring now to FIG. 7, the final stages of deployment and allocation are depicted. As shown, once enterprise gateways 16 establish communication with sensor collector intelligent gateways 14, they will obtain the gateway information and the peer information therefrom. Using this information, enterprise gateways 16 will create and manage a table 66 or dashboard view of ecosystem information. As shown, this table includes an identifier, state, role and location for sensor collector intelligent gateways 14 as well as the peers. Based on this information enterprise gateway 16 will also create mapped out grid 68 of where each component is located.

At this point, ecosystem 10 has been deployed and allocated. As such, it can be used to safely store data components. Referring now to FIG. 8, this is shown in greater detail. Specifically, under the present invention, a data structure 70 can be stored with redundancy within ecosystem 10. As shown, data structure 70 is stored on enterprise gateways 16, sensor collector enterprise gateways 14 and within sensor network 12. In storing data structure 70 in sensor network 12, the entire data structure can be stored on the super peers SP/R1 and SP/R2, while components 72A-D can be stored on the sensor peers SP1-SP4. In breaking down and storing data structure 70 as data components 72A-D, the teachings in the above-incorporated patent applications can be followed. For example, a certain communication path could be followed through sensor peers SP1-SP4 storing data components 72A-D along the way. A "pre-active heartbeat algorithm," could be used to rank the possible paths though sensor peers SP1-SP4.

As data components 72A-B are being stored, a local routing table and/or global routing table could be created and managed. A local routing table could exist on each sensor peer SP1-SP2 to identify the data components that are stored on neighboring sensor peers. A single global routing table could be provided for the entire sensor network 12 that identifies the locations of all data components 72A-D within sensor network 12. As the data components 72A-D are copied/relocated due to potential failures of sensor peers SP1-SP4, an update system within each sensor peer SP1-SP4 could update the routing table(s) accordingly.

III. Illustrative Backup Scenarios

In providing ecosystem 10 as described herein, the present invention provides for backup/resiliency in any number of situations. To this extent, a few exemplary backup scenarios will be described in this section. It should be appreciated, however, that the backup scenarios discussed below are not intended to be exhaustive and are not being described in any particular order.

A. Failure of a Sensor Peer

Turning now to FIG. 9, the failure of one or more sensor peers will be discussed. In this example, it is assumed that sensor peers SP2 and SP4 have been compromised or are no longer functioning. Such an event will be detected by sensor collector intelligent gateways 14 (e.g., by sensor network management interface of FIG. 3), which will update the table of network information (64 of FIG. 6) to reflect the changed states of sensor peers SP2 and SP4. This information is communicated to enterprise gateway 16, which will also update its ecosystem table (66 of FIG. 7) to reflect the changed states of sensor peers SP2 and SP4. Since sensor peers SP2 and SP4 have been compromised, the data components 72B-C stored therein can be relocated to neighboring sensor peers SP1 and/or SP4. This can be accomplished based on a resource availability and/or capability thereof to handle data components 72B-C.

B. Failure of a Sensor Network

Referring now to FIG. 10, the failure of an entire sensor network 12A is shown. In this example, sensor network 12A has been compromised or shut down. Sensor collector intelligent gateways 14 will detect the failure event and relocate data structure 70 to another sensor network 12B. Upon receipt, super peers of sensor network 12B will detect the new data structure 70, and distribute the same according to the resources and abilities of the sensor peers. Sensor collector intelligent gateways 14 will also update its table(s) of gateway information to make note that sensor network 12A is not longer functional. At the same time, communication will be held with enterprise gateway 16, which will update its table of ecosystem information as well.

C. Hazard Detected in a Sensor Network

Referring now to FIGS. 11-12, a scenario is depicted whereby a hazard is detected within sensor network 12. In this scenario, a fire is detected near super peer SP/R1. In this event, super peer SP/R1 will broadcast an alert to the surrounding sensor peers and super peer SP/R2 as well as to sensor collector intelligent gateways 14. Each sensor collector intelligent gateway 14 will then consult its table of gateway information to determine where the fire has occurred. Sensor collector intelligent gateways 14 will then send specific information to enterprise gateway 16, which will determine an action to be taken (e.g., via business process rules), and communicate the same back to sensor network 12 via sensor collector intelligent gateways 14.

Referring to FIG. 12, enterprise gateway 16 has determined to commence a video recording of the incident. This recommended action is passed to sensor network 12 through sensor collector intelligent gateways 14, and the video recording is commenced.

D. Destruction of a Super Peer

Referring now to FIG. 13, the scenario described in conjunction with FIGS. 11-12 is enhanced by the destruction of super peer SP/R1. Specifically, in FIG. 13, the fire hazard has spread and destroyed super peer SP/R1. This event will be detected by sensor collector intelligent gateways 14, which will determine (e.g., using business process rules), which sensor peer SP1-SP4 will replace super peer SP/R1. This determination is generally made based on the resource requirements and proximity of the other sensor peers SP1-SP4 to super peer SP/R1. As such, in this example, sensor peer SP3 has been selected to replace super peer SP/R1. It should be noted that a super peer need not be disabled to cause a role switch. Rather, sensor collector intelligent gateways 14 can initiate the switch of a sensor peer to a super peer role. Once the switch has occurred, sensor collector intelligent gateways 14 will communicate with the new super peer instead of the destroyed super peer. Sensor collector intelligent gateways 14 will also update the table of gateway information to reflect the destruction of super peer SP/R1 and the promotion of sensor peer SP3. Similarly, sensor collector intelligent gateways 14 will communicate notice of the destruction and role switch to enterprise gateway 16, which will update its table of ecosystem information accordingly.

It should be appreciated that the teachings of the present invention could be offered as a business method on a subscription or fee basis. For example, ecosystem 10 or it individual components could be created, maintained, supported and/or deployed by a service provider that offers the functions described herein for customers.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for providing backup for an autonomic sensor network ecosystem, comprising:
   providing the autonomic sensor network ecosystem, wherein the autonomic sensor network ecosystem includes:
      a sensor network having a set of sensor peers and at least one super peer for storing data components,
      a set of sensor collector intelligent gateways in communication with the sensor network, and
      a set of enterprise gateways in communication with the set of sensor collector intelligent gateways;
   storing a set of data components within the sensor network, the sensor collector intelligent gateways and the enterprise gateway;
   maintaining a table of locations of the data components within the sensor network;
   detecting a failure of at least one of the set of sensor peers and the at least one super peer of the sensor network;
   relocating data components stored within the sensor network based on the detected failure, the data components relocated between at least one of the set of sensor peers and the at least one super peer within the sensor network; and
   communicating information, corresponding to the relocating, to the set of sensor collector intelligent gateways and the set of enterprise gateways, and updating the table of locations based on the relocating.

2. The method of claim 1, wherein the failure comprises a failure of at least one of the set of sensor peers.

3. The method of claim 2, wherein the relocating comprises relocating any data components stored in the at least one failing sensor peer to a non-failing sensor peer.

4. The method of claim 1, wherein the failure comprises a failure of the sensor network, and wherein the relocating comprises relocating the data components to another sensor network that is in communication with the set of sensor collector intelligent gateways.

5. The method of claim 1, further comprising maintaining a local routing table on each sensor peer that identifies data components on neighboring sensor peers.

6. The method of claim 5, further comprising, in response to a detected failure and relocation of data components, updating each local routing table on neighboring sensor peers to indicate a new location of the data components.

7. The method of claim 1, wherein storing the set of data components within the sensor network comprises:
   storing at least a portion of the set of data components in each sensor peers of the set of sensor peers; and
   storing the entire set of data components in the at least one super peer of the sensor network.

8. A method for providing backup for an autonomic sensor network ecosystem, comprising:
   providing the autonomic sensor network ecosystem, the autonomic sensor network ecosystem including:
      a sensor network having a plurality of components, the plurality of components including:
         a set of sensor peers for storing at least a portion of a set of data components; and
         at least one super peer for storing the set of data components;
      a set of sensor collector intelligent gateways in communication with the sensor network; and
      a set of enterprise gateways in communication with the set of sensor collector intelligent gateways;
   storing at least a portion of the set of data components on the plurality of components of the sensor network;
   storing the set of data components within the sensor collector intelligent gateways and the enterprise gateway;
   maintaining a table of locations of the set of data components stored on the plurality of components of the sensor network;
   detecting a failure of at least one of the plurality of components of the sensor network;
   relocating data components of the set of data components stored on the at least one detected, failed component of the plurality of components of the sensor network to at least one distinct, non-failing component of the plurality of components of the sensor network; and
   communicating information, corresponding to the relocating, to the set of sensor collector intelligent gateways and the set of enterprise gateways, and updating the table of locations based on the relocating of the data components.

* * * * *